US010061819B2

(12) United States Patent
Cohen et al.

(10) Patent No.: US 10,061,819 B2
(45) Date of Patent: Aug. 28, 2018

(54) UNSUPERVISED BOOSTING OF UNIQUE SEARCH RESULTS IN A METASEARCH ENVIRONMENT

(71) Applicant: International Business Machines Corporation, Armonk, NY (US)

(72) Inventors: Doron Cohen, Mobile Misgav (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 14/974,360

(22) Filed: Dec. 18, 2015

(65) Prior Publication Data

US 2017/0177576 A1   Jun. 22, 2017

(51) Int. Cl.
 G06F 7/00 (2006.01)
 G06F 17/30 (2006.01)
(52) U.S. Cl.
 CPC .... G06F 17/3053 (2013.01); G06F 17/30554 (2013.01); G06F 17/30864 (2013.01)
(58) Field of Classification Search
 CPC ........... G06F 17/3053; G06F 17/30554; G06F 17/30864
 See application file for complete search history.

(56) References Cited

U.S. PATENT DOCUMENTS

| 6,795,820 | B2 | 9/2004 | Barnett |
| 6,829,599 | B2 | 12/2004 | Chidlovskii |
| 7,206,780 | B2* | 4/2007 | Slackman ......... G06F 17/30675 |
| 7,818,314 | B2 | 10/2010 | Chowdhury et al. |
| 7,930,286 | B2* | 4/2011 | Sue ................... G06F 17/30864 707/706 |
| 8,150,793 | B2 | 4/2012 | Ah-Pine |
| 2011/0258080 | A1 | 10/2011 | Lunenfeld |
| 2014/0059028 | A1* | 2/2014 | Chen ................ G06F 17/30864 707/706 |

OTHER PUBLICATIONS

Aslam, Javed, "Models for Metasearch", Northeastern Univeristy College of Computer and Information Science, CSG339-Information Retrieval(graduate), Fall 2006, Metasearch: Data Fusion; Sep. 6, 2006, Last modified: Nov. 15, 2006, 10:10:25, pp. 1-76, <http://www.ccs.neu.edu/home/jaa/CSG339.06F/Lectures/index.html>.
Asalm et al., "Models for Metasearch", SIGIR'01, Sep. 9-12, 2001, New Orleans, Louisiana, USA, Copyright 2001 ACM, pp. 276-284.
Klementiev, et al., "An Unsupervised Learning Algorithm for Rank Aggregation", ECML '07, LNAI 4701, pp. 616-623, 2007, © Springer-Verlag Berlin Heidelberg.

(Continued)

*Primary Examiner* — Azam M Cheema
(74) *Attorney, Agent, or Firm* — Monchai Chuaychoo

(57) ABSTRACT

A search query is received from a user. Multiple search results in response to the search query are received from multiple search engines. Each of the search engines provides one or more search results of the multiple search results. One or more features relating to the uniqueness of the multiple search results of each of the search engines are determined. A ranking of the multiple search results is determined based on the one or more features. The multiple search results are displayed to the user based on the ranking.

17 Claims, 3 Drawing Sheets

(56) References Cited

OTHER PUBLICATIONS

Mourao et al., "Multimodal medical information retrieval with unsupervised rank fusion", Research Gate, Computerized Medical Imaging and Graphics 00, May 2014, pp. 1-13, <http://researchgate.net/publications/262939645>.

Wei et al., "iRANK: A rank-learn-combine framework for unsupervised ensemble ranking", Journal of American Society for Information Science and Technology, 2010, © 2010, ASIS&T, pp. 1-12.

Xu et al., "AdaRank: a boosting algorithm for information retrieval", SIGIR'07, Jul. 23-27, 2007, Amsterdam, The Netherlands, Copyright 2007 ACM, pp. 391-398.

\* cited by examiner

UNSUPERVISED BOOSTING OF UNIQUE SEARCH RESULTS IN A METASEARCH ENVIRONMENT

BACKGROUND OF THE INVENTION

The present invention relates generally to the field of information retrieval, and more particularly to improving metasearch results.

Information retrieval is the task of obtaining information relevant to an information need from a collection of information. An information retrieval process begins when a user submits a statement of information need (search query) into an information retrieval system. For example, a user may submit a question into a web search engine to obtain information from the World Wide Web that answers the question. Typically, a search engine identifies several items of information from a collection of information as matches to a search query, as opposed to uniquely identifying a single matching item. Information retrieval systems typically determine a numeric score for each identified item based on how well each item matches the query and rank the items according to the score.

A metasearch engine is a search engine that utilizes the information of one or more other search engines to produce results to a search query. Metasearch engines receive a search query from a user, send out the search query to third party search engines, and merge the results into a single set to be provided to the user. By combining multiple results from different search engines, a metasearch efficiently provides more accurate results since less effort is required to access more information.

SUMMARY

A search query is received from a user. Multiple search results in response to the search query are received from multiple search engines. Each of the search engines provides one or more search results of the multiple search results. One or more features relating to the uniqueness of the multiple search results of each of the search engines are determined. A ranking of the multiple search results is determined based on the one or more features. The multiple search results are displayed to the user based on the ranking.

DETAILED DESCRIPTION

Embodiments of the present invention recognize that information stored on databases is constantly expanding, which makes it increasingly difficult for a single search engine to index the entire web for resources. Embodiments of the present invention recognize that where multiple search engines are utilized to retrieve information, the scores and ranks of items stored by search engines can greatly vary in the manner in which they are determined from search engine to search engine, which often causes retrieval of irrelevant, or less relevant, items of information.

Embodiments of the present invention provide techniques for search results retrieved from multiple search sources by applying a factor to the search score of each result that accounts for the uniqueness as well as commonality of the results from each source.

Figure 1:
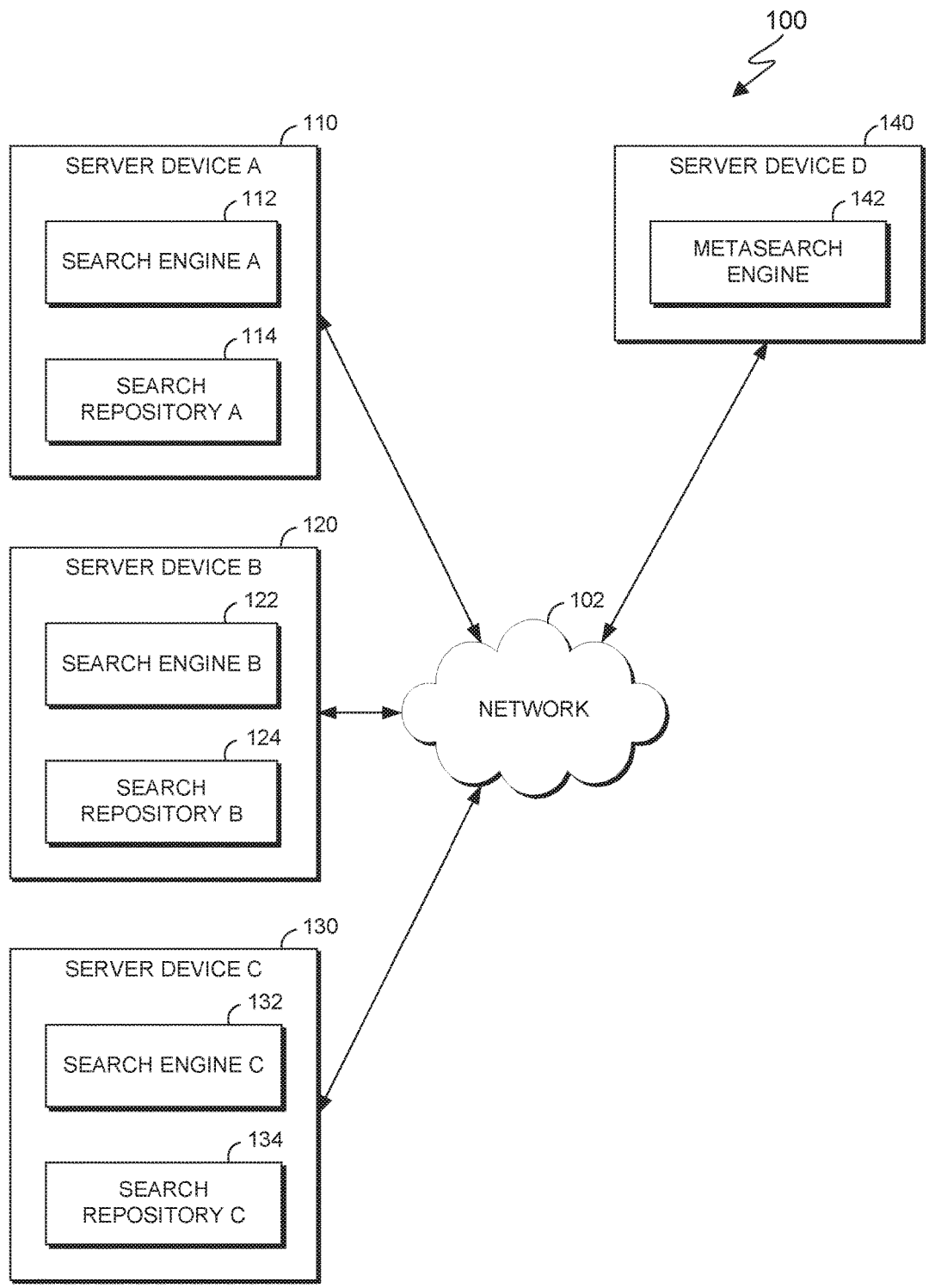
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In the illustrated embodiment, distributed data processing environment 100 includes server device A 110, server device B 120, server device C 130, and server device D 140. Server device A 110, server device B 120, server device C 130, and server device D 140 are interconnected through network 102. In an embodiment, distributed data processing environment 100 may additionally include any other computing device (not shown) connected to network 102.

In an embodiment, network 102 may generally be any combination of connections and protocols that supports communications between server device A 110, server device B 120, server device C 130 and any other computing device connected to network 102. In example embodiments, network 102 may be a local area network (LAN), a telecommunications network, a wide area network (WAN), such as the Internet, or any combination thereof. In an embodiment, network 102 may include wired, wireless, or fiber optic connections.

In an embodiment, server device A 110 may generally be any electronic device or combination of electronic devices capable of executing computer readable program instructions. In example embodiments, server device A 110 may be a personal computer, workstation, mobile phone, or personal digital assistant. In an embodiment, server device A 110 may be a computer system utilizing clustered computers and components, such as database server devices or application server devices, that act as a single pool of seamless resources when accessed by elements of distributed data processing environment 100, such as in a cloud computing environment. Server device A 110 may include components as depicted and described with respect to FIG. 3, in accordance with embodiments of the present invention. In an embodiment, server device B 120, server device C 130, and server device D may be substantially similar to server device A 110.

In the illustrated embodiment, server device A 110 includes search engine A 112 and search repository A 114. In an alternative embodiment, search engine A 112 may be located on any other computing device connected to network 102, and search engine A 112 may communicate with server device A 110 through network 102. In another alternative embodiment, search repository A 114 may be located on any other computing device connected to network 102, and search repository A 114 may communicate with server device A 110 through network 102. In an embodiment, search engine A 112 is any computer program, application, or subprogram of a larger computer program that identifies items of information stored in search repository A 114 that are relevant to a search query, in accordance with embodiments of the present invention. In an embodiment, search repository A 114 contains items of information that are searched and identified as relevant to a search query by search engine A 112, in accordance with embodiments of the present invention.

In an embodiment, for each item in search repository A 114 identified by search engine A 112 as relevant to the search query, search engine A 112 may assign a search score to an item based on the likelihood that the item contains information relevant to the search query, and search engine A 112 may assign a rank to an item based on the search score of the item relative to the search scores of the other identified items. In an embodiment, the search query may be provided by metasearch engine 142. In an embodiment, search engine B 122 and search engine C 132 may be substantially similar to search engine A 112. The term "search engine" may herein refer to any one of search engine A 112, search engine B 122, or search engine C 132.

In an embodiment, items of information may be in various formats, for example, text information, image information, or audio information. For example, items of information may be text documents, web pages, portions of web pages (e.g., text titles and headings), images, audio files, or any other information capable of being stored and searched in accordance with embodiments of the present invention. In an embodiment, search repository A 114, search repository B 124, and search repository C 134 may contain information from a common set of information, such as the World Wide Web. In an alternative embodiment, search repository A 114, search repository B 124, and search repository C 134 may contain information from unrelated sets of information. For example, search repository A 114 may contain medical-related information, search repository B 124 may contain law-related information, and search repository C 134 may contain geography-related information, where each of the search repositories are maintained independently of each other.

In an embodiment, search repository A 114 may be implemented using any non-volatile storage media known in the art. For example, search repository A 114 may be implemented with a tape library, optical library, one or more independent hard disk drives, or multiple hard disk drives in a redundant array of independent disks (RAID). In an embodiment, search repository A 114 may be implemented using any suitable storage architecture known in the art. For example, search repository A 114 may be implemented with a relational database or an object-oriented database. In an embodiment, search repository B 124 and search repository C 134 may be substantially similar to search repository A 114.

In an embodiment, metasearch engine 142 is any computer program, application, or subprogram of a larger computer program that retrieves and provides results to a search query by directing search engine A 112, search engine B 122, and search engine C 132 (the search engines) to perform searches according to the search query, merging the results of the searches, and ranking the results based on, in general, the relevance of each result to the search query, in accordance with embodiments of the present invention. In an embodiment, metasearch engine 142 may rank the results of the search query by determining a new score (or rank) (metasearch score) for each result based on the original score (or rank) assigned to each result by the search engines and by revising the metasearch score for each result in accordance with workflow 200. In an embodiment, metasearch engine 142 revises the original assigned score in part according to an algorithmic approach.

As an example, where a search result is provided by more than one of the search engines, metasearch engine 142 may utilize metasearch (or fusion) approaches CombMNZ, CombSUM, CombMIN, or CombMAX to determine the metasearch score for the search result. CombMNZ may include determining the sum of each original score assigned to the search result by the various search engines. CombMAX and CombMIN may determine the metasearch score based on the maximum and minimum original scores, respectively, assigned to the search result by the various search engines. CombMNZ may multiply the metasearch score for the search result determined by CombSUM by the number of search engines that provided the search result. Metasearch engine 142 may then further revise the metasearch scores in accordance with workflow 200.

In an embodiment, metasearch engine 142 may be integrated with any other computer program connected to network 102 (e.g., as a plug-in, add-on, extension, etc.). In an embodiment, metasearch engine 142 may be connected to one or more user interfaces (not shown) that allow a user to utilize metasearch engine 142. For example, in an embodiment, a user may provide the search query through a user interface of metasearch engine 142.

In an embodiment, a user interface is the information, such as graphic, text, and sound, a program presents to a user and the control sequences the user employs to control the program. There are many types of user interfaces. For example, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. The actions in GUIs may be performed by a user through direct manipulation of the graphical elements.

Figure 2:
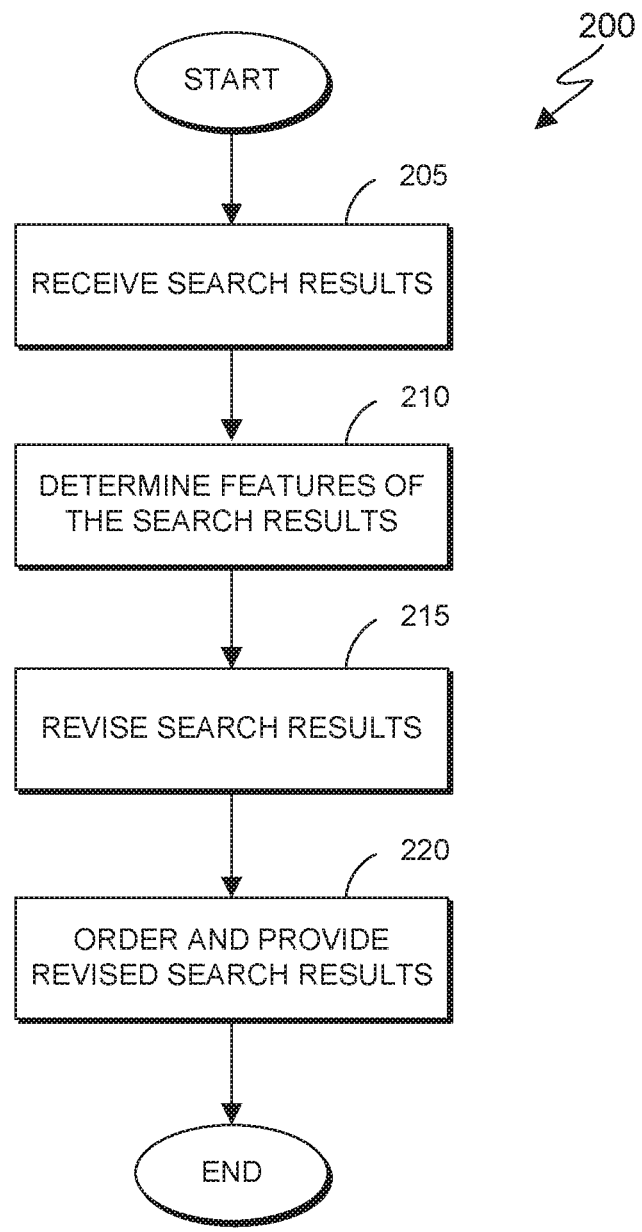
FIG. 2 is a flowchart of operational steps for providing a revised set of search results merged from multiple search sources, in accordance with an embodiment of the present invention.

FIG. 2 is a flowchart of workflow 200 illustrating operational steps for providing a revised set of search results merged from multiple search sources. In the illustrated embodiment, the steps of workflow 200 are performed by metasearch engine 142. In an alternative embodiment, the steps of workflow may be performed by any other computer program, or programs, while working with metasearch engine 142. In an embodiment, metasearch engine 142 begins performing the steps of workflow 200 in response to receiving an indication to provide revised search results from shared repositories. For example, a user, through the user interface of metasearch engine 142 (user interface not shown), may provide an indication to metasearch engine 142 to provide revised search results for searches of search repository A 114, search repository B 124, and search repository C 134.

Metasearch engine 142 receives search results (step 205). In an embodiment, the search results, and corresponding scores and ranks of the search results, are retrieved from searches of search repository A 114, search repository B 124, and search repository C 134 by search engine A 112, search engine B 122, and search engine C 132, respectively, according to a search query. In an embodiment, a user provides the search query to metasearch engine 142 through the user interface of metasearch engine 142, and metasearch engine 142 directs search engine A 112, search engine B 122, and search engine C 132 to perform a search according to the search query.

In an embodiment, metasearch engine 142 determines and assigns a new search score (metasearch score) for each search result. In an embodiment, metasearch engine 142 may normalize the search score or rank initially assigned to each search result by a search engine to account for differences in the scoring or ranking approaches among the search engines. For example, metasearch engine 142 may normalize the search scores according to the following algorithm: normalized score=(score(sr)−min)/(max−min), where "min" and "max" is the minimum search score (min) and maximum search score (max is), respectively, of all search results provided by the search engines, and "score(sr)" is the search score of a given search result. As another example, metasearch engine 142 may normalize the score of each search result by assigning each search result a score according to the following algorithm: 1/(rank(sr)+h), where "rank(sr)" is the rank of a given search result and "h" is any constant (e.g., a common value of "h" may be 60).

As an example, metasearch engine 142 may utilize a metasearch (or fusion) approach such as CombMNZ, CombSUM, CombMIN, or CombMAX to determine the metasearch scores.

Metasearch engine 142 determines features of the search results (step 210). In other words, in an embodiment, metasearch engine 142 determines features of the retrieved search results that include the total number of search results retrieved from the search engines (k), the number of search results retrieved from each search engine providing results ($k_i$, for a given search engine), the number of results retrieved from all search engines other than a given search engine ($k_o$) (e.g., $k_o=k-k_i$), and features relating to the uniqueness of the search results of each search engine. In an embodiment, features relating to the uniqueness of the search results of the search engines include the set of search results retrieved from each search engine providing results ($L_i$, for a given search engine), the set of search results retrieved from all search engines other than a given search engine ($L_o$), the set of search results that are unique to a given search engine (Unique($L_i$)) (i.e., the set of search results in $L_i$ and not in $L_o$), the number of search results that are unique to the other search engines (UniqueOther($L_i$)) (i.e., the set of search results in $L_o$ and not in $L_i$), and the number of search results of a given search engine that are also provided by at least one search engine other than the given search engine (Agreeable($L_i$)) (i.e., the number of search results in both $L_i$ and $L_o$).

As an example (the first example), metasearch engine 142 directs search engine A 112, search engine B 122, and search engine C 132 to provide search results for the search query "big cities". In response, search engine A 112 provides the set of search results ["New York City", "Albany", "Syracuse", and "Rochester"], and both search engine B 122 and search engine C 132 provide the set of search results ["New York City", "Chicago", "Boston", and "San Francisco"].

In this example, metasearch engine 142 may determine that each of the search engines provides 4 search results (i.e., $k_i=4$), the total number of search results retrieved is 12 (i.e., k=12), and the number of results retrieved from a search engine other than any given search engine is 8 (i.e., $k_o=8$). For search engine A 112, metasearch engine 142 may determine that the search results "Albany", "Syracuse", and "Rochester" from search engine A 112 are unique to search engine A 112 since they are not also in the search results of search engine B 122 or search engine C 132 (i.e., Unique($L_A$) consists of "Albany", "Syracuse", and "Rochester"). Metasearch engine 142 may determine that the number of search results that are unique to the search engines other than search engine A 112 is 3 since "Chicago", "Boston", and "San Francisco" are in the search results of search engine B 122 (as well as search engine C 132) and are not also in the search results of search engine A 112 (i.e., UniqueOther($L_A$)=3). Metasearch engine 142 may determine that the number of search results of search engine A 112 that are also provided by either search engine B 122 or search engine C 132 is 1 since all search engines provided the result "New York City" (i.e., Agreeable($L_A$)=1).

Metasearch engine 142 determines the features for search engine B 122 and search engine C 132 in a similar manner (e.g., metasearch engine 142 similarly determines Unique($L_B$), UniqueOther($L_B$), Agreeable($L_B$) for search engine B 122 as well as Unique($L_C$), UniqueOther($L_C$), and Agreeable($L_C$) for search engine C 132).

As another example (the second example), metasearch engine 142 directs search engine A 112, search engine B 122, and search engine C 132 to provide search results for the search query "big cities". In response, search engine A 112 provides the set of search results ["New York City", "Albany", "Syracuse", and "Rochester"], search engine B 122 provides the set of search results ["New York City", "Los Angeles", "Sacramento", and "San Francisco"], and search engine C 132 provides the set of search results ["New York City", "London", "Beijing", and "Moscow"].

As in the first example, metasearch engine 142 may determine that each of the search engines provides 4 search results (i.e., $k_i=4$), the total number of search results retrieved is 12 (i.e., k=12), and the number of results retrieved from a search engine other than any given search engine is 8 (i.e., $k_o=8$). For search engine A 112, metasearch engine 142 may also determine that the search results "Albany", "Syracuse", and "Rochester" from search engine A 112 are unique to search engine A 112 since they are not also in the search results of search engine B 122 or search engine C 132 (i.e., Unique($L_A$) consists of "Albany", "Syracuse", and "Rochester"). In this case, however, metasearch engine 142 may determine that the number of search results that are unique to the search engines other than search engine A 112 is 6 since "Chicago", "Boston", and "San Francisco" are in the search results of search engine B 122 and not search engine A 112 and "London", "Beijing", and "Moscow" are in the search results of search engine C 132 and not search engine A 112 (i.e., UniqueOther($L_A$)=6). As in the first example, metasearch engine 142 may determine that the number of search results of search engine A 112 that are also provided by either search engine B 122 or search engine C 132 is 1 since all search engines provided the result "New York City" (i.e., Agreeable($L_A$)=1).

Metasearch engine 142 determines the features for search engine B 122 and search engine C 132 in a similar manner (e.g., metasearch engine 142 similarly determines Unique($L_B$), UniqueOther($L_B$), Agreeable($L_B$) for search engine B 122 as well as Unique($L_C$), UniqueOther($L_C$), and Agreeable($L_C$) for search engine C 132).

Metasearch engine 142 revises the search results (step 215). In other words, in an embodiment, metasearch engine 142 determines a revised score for each search result by revising the metasearch score of each search result. In an embodiment, for each search engine providing search results, metasearch engine 142 revises the metasearch score of each search result that is unique to the search engine according to an algorithm that utilizes the features determined in step 210. In an embodiment, for each search result in UniqueOther($L_i$), metasearch engine 142 multiplies the metasearch score of the search result by the value of: [square root (Agreeable($L_i$))]*[UniqueOther($L_i$)/$k_o$]. In this manner, metasearch engine 142 may determine that a search result that is unique to a search engine is less relevant to the search query where there is greater commonality among the search results of the other search engines. Similarly, metasearch engine 142 may determine that the relevance of a search result that is unique to a search engine is less affected where there is less commonality among the search results of the other search engines.

As an example, under the facts of the first example in step 210, metasearch engine 142 determines, for search engine A 112, that Agreeable($L_A$)=1, UniqueOther($L_A$)=6, and $k_o$=8. Metasearch engine 142 may revise the metasearch scores of the search results for search engine A 112 by multiplying the metasearch score of each search result unique to search engine A 112 (i.e., each search result in Unique($L_A$)) by the value of: [square root (Agreeable($L_A$))]*[UniqueOther($L_A$)/$k_o$]. Applying the determined features to the algorithm, metasearch engine 142 determines a revised search score for each search result in Unique($L_A$) by multiplying the metasearch score of each by [sqrt(1)]*[3/8], or 0.375. In this case, metasearch engine 142 determines that the reliability, and thus relevance, of a search result unique to search engine A 112 is significantly lessened, and metasearch engine 142 expresses the lower relevance by multiplying the metasearch score by 0.375.

As another example, under the facts of the second example in step 210, metasearch engine 142 determines, for search engine A 112, that Agreeable($L_A$)=1, UniqueOther ($L_A$)=6, and $k_o$=8. As in the previous example, metasearch engine 142 may revise the metasearch scores of the search results for search engine A 112 by multiplying the metasearch score of each search result unique to search engine A 112 (i.e., each search result in Unique($L_A$)) by the value of: [square root (Agreeable($L_A$))]*[UniqueOther($L_A$)/$k_o$]. Applying the determined features to the algorithm, metasearch engine 142 determines a revised search score for each search result in Unique($L_A$) by multiplying the metasearch score of each by [sqrt(1)]*[6/8], or 0.75. In this case, metasearch engine 142 determines that the reliability, and thus relevance, of a search result unique to search engine A 112 is lessened, but not to the extent as the revised scores in the previous example. Metasearch engine 142 expresses the slightly lower relevance by multiplying the metasearch score by 0.75.

Metasearch engine 142 orders and provides the revised search results (step 220). In other words, in an embodiment, metasearch engine 142 ranks the search results based on the revised score determined for each search result. In an embodiment, the search results are provided through the user interface of metasearch engine 142. In an embodiment, where metasearch engine 142 is a plug-in, add-on, extension, etc. of a different computer program, metasearch engine 142 may provide the revised search results to the different program, and the search results may be provided through the user interface of the different program. In an embodiment, metasearch engine 142 provides the search results in a ranked order. For example, metasearch engine 142 may provide the results in a list format where the highest-ranked result is the first result of the list and the lowest-ranked result is the last result of the list.

The term "revised score" may herein refer to metasearch scores that have been revised for search results in accordance with step 215 as well as metasearch scores for search results that are not affected by step 215, i.e., search results that are not unique to a search engine (i.e., not in Unique ($L_i$)). In an embodiment, the search result with the highest revised score is ranked first, and the search result with the lowest revised score is ranked last.

Figure 3:
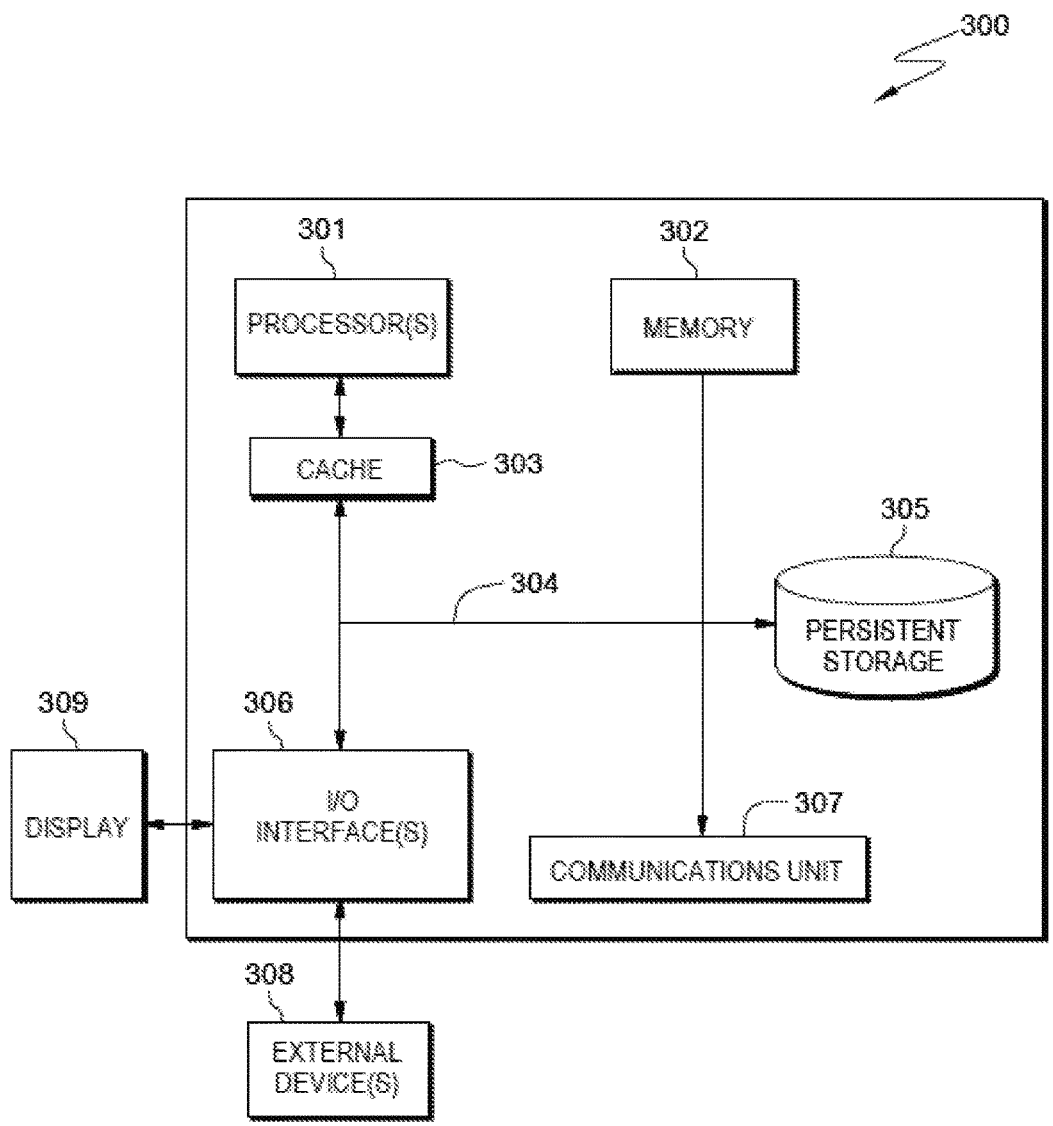
FIG. 3 is a block diagram of components of the server devices of FIG. 1, which includes booster program 144, in accordance with an embodiment of the present invention.

FIG. 3 depicts computing system 300, which illustrates components of server device A 110, server device B 120, server device C 130, and server device D 140, which includes booster program 144. Computing system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In an embodiment, memory 302 includes random access memory (RAM) (not shown). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The descriptions of the various embodiments of the present invention have been presented for purposes of illustration, but are not intended to be exhaustive or limited to the embodiments disclosed. Modifications and variations of the presented embodiments will be apparent to those of ordinary skill in the art without departing from the scope and spirit of the invention. The terminology used herein was chosen to best explain the principles of the embodiment, to best explain the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing search results, the method comprising:
    receiving, by one or more computer processors, a search query from a user;
    receiving, by one or more computer processors, a plurality of search results in response to the search query from a plurality of search engines, wherein the plurality of search engines provides one or more search results of the plurality of search results;
    determining, by one or more computer processors, one or more features relating to a uniqueness of the one or more search results of the plurality of search engines;
    calculating, by one or more computer processors, a ranking of the plurality of search results based on the one or more features, wherein the calculating further comprises:
        determining, by one or more computer processors, a first score for the search result of the plurality of search results;
        determining, by one or more computer processors, the search result of the plurality of search results that is unique to only one search engine of the plurality of search engines;
        determining, by one or more computer processors, a second score for the search results unique to the search engine, wherein the second score comprises the first score of the search results unique to the search engine multiplied by a number of search results that are unique to a remaining search engines of the plurality of search engines and divided by a total number of search results that are provided by the remaining search engines, and wherein the remaining search engines do not include the search engine; and
        determining, by one or more computer processors, a ranking of the plurality of search results based on an order of increasing score of the plurality of search results, wherein the score is the second score of the plurality of search results or the first score of the plurality of search results if there is no second score, and wherein the order of increasing score includes a highest ranking for a search result with a highest score; and
    outputting, by one or more computer processors, the plurality of search results based on the ranking to be used by the user.

2. The method of claim 1, wherein the one or more features relating to the uniqueness of the one or more search results of the plurality of search engines include one or more of following: the one or more search results that is unique to a search engine of the plurality of search engines, a number of search results that are unique to a remaining search engines of the plurality of search engines, wherein the remaining search engines do not include the search engine, and a number of search results that are provided by both the search engine and at least one of the remaining search engines.

3. The method of claim 1, wherein outputting the plurality of search results according to the ranking comprises:
    displaying, by one or more computer processors, the plurality of search results in an order of decreasing ranking of the plurality of search results, wherein the order of decreasing ranking includes the search result with the highest ranking as first.

4. The method of claim 1, wherein the second score further comprises the first score of the search results unique to the search engine multiplied by the square root of a number of search results that are provided by both the search engine and at least one of the remaining search engines.

5. The method of claim 1, wherein determining the first score comprises:
    receiving, by one or more computer processors, a first score for the plurality of search results from a search engine of the plurality of search engines; and
    determining, by one or more computer processors, the first score based on, at least in part, one of the following approaches: CombMNZ, CombSUM, CombMIN, or CombMAX.

6. The method of claim 1, further comprising:
    normalizing, by one or more computer processors, the first score to account for differences in scoring approaches among the plurality of search engines.

7. A computer program product for providing search results, the computer program product comprising:
    one or more non-transitory computer readable storage media; and
    program instructions stored on the one or more non-transitory computer readable storage media, the program instructions comprising:
        program instructions to receive a search query from a user;
        program instructions to receive a plurality of search results in response to the search query from a plurality of search engines, wherein the of the plurality of search engines provides one or more search results of the plurality of search results;
        program instructions to determine one or more features relating to a uniqueness of the one or more search results of the of the plurality of search engines;
        program instructions to calculate a ranking of the plurality of search results based on the one or more features, wherein to calculate further comprises:
            program instructions to determine a first score for the search result of the plurality of search results;
            program instructions to determine the search result of the plurality of search results that is unique to only one search engine of the plurality of search engines;
            program instructions to determine a second score for the search results unique to the search engine, wherein the second score comprises the first score of the search results unique to the search engine multiplied by a number of search results that are unique to a remaining search engines of the plurality of search engines and divided by a total number of search results that are provided by the remaining search engines, and wherein the remaining search engines do not include the search engine; and program instructions to determine a ranking of the plurality of search results based on an order of increasing score of the plurality of search results, wherein the score is the second score of the plurality of search results or the first score of the plurality of search results if there is no second score, and wherein the order of increasing score includes a highest ranking for a search result with a highest score; and program instructions to output the plurality of search results to the user based on the ranking.

8. The computer program product of claim 7, wherein the one or more features relating to the uniqueness of the one or more search results of the plurality of search engines include one or more of following: the one or more search results that is unique to a search engine of the plurality of search engines, a number of search results that are unique to a remaining search engines of the plurality of search engines, wherein the remaining search engines do not include the search engine, and a number of search results that are provided by both the search engine and at least one of the remaining search engines.

9. The computer program product of claim 7, wherein the program instructions to output the plurality of search results according to the ranking comprise:
program instructions to display the plurality of search results in an order of decreasing ranking of the plurality of search results, wherein the order of decreasing ranking includes the search result with the highest ranking as first.

10. The computer program product of claim 7, wherein the second score further comprises the first score of the search results unique to the search engine multiplied by the square root of a number of search results that are provided by both the search engine and at least one of the remaining search engines.

11. The computer program product of claim 7, wherein the program instructions to determine the first score comprise:
program instructions to receive a first score for the plurality of search results from a search engine of the plurality of search engines; and
program instructions to determine the first score based on, at least in part, one of the following approaches: CombMNZ, CombSUM, CombMIN, or CombMAX.

12. The computer program product of claim 7, further comprising:
program instructions to normalize the first score to account for differences in scoring approaches among the plurality of search engines.

13. A computer system for providing search results, the computer system comprising:
one or more computer processors;
one or more computer readable storage media; and
program instructions, stored on the one or more computer readable storage media, for execution by at least one of the one or more computer processors, the program instructions comprising:

program instructions to receive a search query from a user;
program instructions to receive a plurality of search results in response to the search query from a plurality of search engines, wherein the plurality of search engines provides one or more search results of the plurality of search results;
program instructions to determine one or more features relating to a uniqueness of the one or more search results of the plurality of search engines;
program instructions to calculate a ranking of the plurality of search results based on the one or more features, wherein to calculate further comprises:
program instructions to determine a first score for the search result of the plurality of search results;
program instructions to determine the search result of the plurality of search results that is unique to only one search engine of the plurality of search engines;
program instructions to determine a second score for the search results unique to the search engine, wherein the second score comprises the first score of the search results unique to the search engine multiplied by a number of search results that are unique to a remaining search engines of the plurality of search engines and divided by a total number of search results that are provided by the remaining search engines, and wherein the remaining search engines do not include the search engine; and
program instructions to determine a ranking of the plurality of search results based on an order of increasing score of the plurality of search results, wherein the score is the second score of the plurality of search results or the first score of the plurality of search results if there is no second score, and wherein the order of increasing score includes a highest ranking for a search result with a highest score; and
program instructions to output the plurality of search results based on the ranking to be used by the user.

14. The computer system of claim 13, wherein the one or more features relating to the uniqueness of the one or more search results of the plurality of search engines include one or more of following: the one or more search results that is unique to a search engine of the plurality of search engines, a number of search results that are unique to a remaining search engines of the plurality of search engines, wherein the remaining search engines do not include the search engine, and a number of search results that are provided by both the search engine and at least one of the remaining search engines.

15. The computer system of claim 13, wherein the program instructions to output the plurality of search results according to the ranking comprise:
program instructions to display the plurality of search results in an order of decreasing ranking of the plurality of search results, wherein the order of decreasing ranking includes the search result with the highest ranking as first.

16. The computer system of claim 13, wherein the second score further comprises the first score of the search results unique to the search engine multiplied by the square root of a number of search results that are provided by both the search engine and at least one of the remaining search engines.

17. The computer system of claim 13, wherein the program instructions to determine the first score comprise:
   program instructions to receive a first score for the plurality of search results from a search engine of the plurality of search engines; and
   program instructions to determine the first score based on, at least in part, one of the following approaches: CombMNZ, CombSUM, CombMIN, or CombMAX.

\* \* \* \* \*